(12) United States Patent
Lo et al.

(10) Patent No.: US 7,599,876 B1
(45) Date of Patent: Oct. 6, 2009

(54) ELECTRONIC MARKET-MAKER

(75) Inventors: Andrew Lo, Lexington, MA (US); Tung Chan, Cambridge, MA (US); Tomaso Poggio, Wellesley, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 715 days.

(21) Appl. No.: 09/526,633

(22) Filed: Mar. 15, 2000

Related U.S. Application Data (60) Provisional application No. 60/124,579, filed on Mar. 16, 1999.

(51) Int. Cl.
*G06Q 40/00* (2006.01)
(52) U.S. Cl. ........................................................ 705/37
(58) Field of Classification Search ............... 705/35–45
See application file for complete search history.

(56) References Cited

U.S. PATENT DOCUMENTS

| | | | |
|---|---|---|---|
| 4,412,287 A | | 10/1983 | Braddock, III |
| 5,101,353 A | | 3/1992 | Lupien |
| 5,845,266 A | | 12/1998 | Lupien |
| 5,857,176 A | * | 1/1999 | Ginsberg ..................... 705/36 |
| 5,873,071 A | * | 2/1999 | Ferstenberg et al. .......... 705/37 |
| 5,915,209 A | * | 6/1999 | Lawrence ................... 340/3.7 |
| 5,950,176 A | | 9/1999 | Keiser |
| 6,236,980 B1 | * | 5/2001 | Reese ........................... 705/36 |

OTHER PUBLICATIONS

New York Times, NYSE Proposal Would Halt Trading During Price Swings, Jan. 21, 1988.*
Digital Flubs, ISBN 01908286, May 12, 1997.*
McMurray, Scott, Traders Say Curbs Enacted Since the Crash May Have Steepened Stock Market Plunge, Wall Street Journal, Apr. 15, 1988.*
Bucatinsky, Julio, Emerging Markets go Shopping in Hong Kong, Wall Street Journal, Oct. 1995, ISBN 106089X.*
Business Editors & High Tech Writers. CBQ, Inc. Applies for Foreign Protection of Its Patent Pending Technology, Jan. 28, 1999, Business Wire, New York, p. 1 (3 pages).*
Nils H. Hakansson, et al. "On the Feasibility of Automated Market Making by a Programmed Specialist" Journal of Finance, 40(1): 1-20 (1985).
Kalman, et al. "A Simulation Model of Stock Exchange Trading" Simulation: 4:181-191 (1991).

* cited by examiner

*Primary Examiner*—Kambiz Abdi
*Assistant Examiner*—Jennifer Liversedge
(74) *Attorney, Agent, or Firm*—Morgan, Lewis & Bockius LLP (57) ABSTRACT

Disclosed herein is an automated Electronic Market-Maker, comprising a Market Quality Control Module for generating trading recommendations to maintain market quality; an Inventory Control Module for generating trading recommendations to maintain inventory; a Speculation Module for generating trading recommendations to generate profits; and an Arbitration Module to receive trading recommendations from said Market Quality Control Module, Inventory Control Module, and Speculation Control Module and resolve any conflicts between the received recommendations.

7 Claims, 7 Drawing Sheets

ELECTRONIC MARKET-MAKER

The present patent application is based upon Provisional Application No. 60/124,579, filed on Mar. 16, 1999, entitled ELECTRONIC MARKET-MAKER, by Andrew Lo, Tung Chan and Tomaso Poggio, the disclosure of which is incorporated herein by reference.

This invention was made with government support under Grant Number ASC-9217041 awarded by the National Science Foundation. The government has certain rights in the invention.

FIELD OF THE INVENTION

This invention generally relates to a data processing system for managing a securities market. More particularly, the present invention is directed to a data processing system and method for managing the operations of a Specialist in creating a market on an exchange for select assets among plural trading entities.

BACKGROUND OF THE INVENTION

Highly specialized markets have evolved through the years to permit the enhanced trading of capital assets, such as stocks and bonds. The fundamental function of these markets is to bring buyers together with sellers so that the subject securities can be exchanged in an efficient and fair manner. To insure fairness and efficiency, the market must provide participants the ability to discover prices that trigger trading. For example, all markets have some mechanism to deliver price information to participants so that trading decisions can be made. Once price discovery exists, the markets must then permit meaningful trading volume to flow evenly and without artificial price disruptions that would otherwise impede fairly priced trading.

In modern security trading, equity securities are traded in two distinct forums. The first and perhaps best known forum is an "exchange", such as the New York Stock Exchange (NYSE). Major exchanges have a number of unique characteristics and rely on a group of large financial organizations that are well capitalized to act as Specialists on select securities. The second forum for trading is known as over-the-counter or OTC and is exemplified by the National Association of Security Dealers (NASDAQ).

The effectiveness of a trading exchange relies to a great extent on the operation of the Specialist. As stated above, Specialists are responsible for controlling trading of select securities that are assigned to the Specialist. They perform two core functions. First, the Specialist must maintain price continuity. This continuity is characterized by the degree of price change that takes place from one transaction to the next. It is critical and a fundamental objective of the Specialist to minimize price changes between transactions. Second, the Specialist seeks to enhance market depth—that is, the volume of trades at select price changes between transactions.

Specialists operate on the exchange by establishing a price quote for a select security, expressed in terms of a current best bid and offer for specified volume as entered by market participants. The best current bid and offer create a price spread, i.e., the difference between the bid and offer price. Traders then buy and sell based on the quote given and shares are transacted through the Specialist.

In addition to this passive role, the Specialist often participates in a security transaction as a trader in its own name. This is a critical role for the Specialist; as these trades are the vehicle used by the Specialist to maintain price continuity and market depth—and to avoid volatility.

The advent of computer systems has dramatically altered and greatly enhanced the operation of the securities exchanges. Today, virtually all exchanges sophisticated data processing and networking technologies to improve operating efficiency. In most cases, these systems are used as a means of communication between market participants, as exemplified by the New York Stock Exchange's Designated Order Turnaround (DOT) system. Other advanced systems include order matching or crossing programs, such as the NASDAQ Small Order Execution Services (SOES) system, the Chicago Mercantile Exchange's GLOBEX system, and the Mercantile Exchange and ITG's POSIT 4.0 system.

Several patents discuss system for trading. Lupien, et al., U.S. Pat. No. 5,845,266, for a CROSSING NETWORK UTILIZING SATISFACTION DENSITY PROFILE WITH PRICE DISCOVERY FEATURES, issued Dec. 1, 1998, discloses a crossing network that matches buy and sell orders based upon a satisfaction and quantity profile and includes a number of trader terminals that can be used for entering orders. The orders are entered in the form of a satisfaction density profile that represents a degree of satisfaction to trade a particular instrument at various (price, quantity) combinations. Typically, each order is either a buy order or a sell order. The trader terminals are coupled to a matching controller computer. The matching controller computer can receive as input the satisfaction density profiles entered at each one of the trading terminals. The matching controller computer matches orders (as represented by each trader's satisfaction density profile) so that each trader is assured that the overall outcome of the process (in terms of average price and size of fill) has maximized the mutual satisfaction of all traders. Typically, the matching process is anonymous. The matching process can be continuous or a batch process, or a hybrid of the two. Unmatched satisfaction density profiles can be used to provide spread and pricing information. Factors other than price and quantity also may be used to determine the degree of satisfaction. Optionally, priority may be given to certain profiles in the matching process to accommodate stock exchange rules, for example, requiring that priority be given to orders exhibiting the best price, regardless of size or any other consideration.

Lupien, et al., U.S. Pat. No. 5,101,353, for an AUTOMATED SYSTEM FOR PROVIDING LIQUIDITY TO SECURITIES MARKETS, issued Mar. 31, 1992, discloses an automated system for managing one or more large investor portfolios containing both cash and numerous, diversified securities in a real time environment provides added liquidity to the securities markets while maintaining predetermined portfolio objectives for each portfolio. The disclosed system uses data processing equipment to place buy and sell orders on securities markets and with automated brokers to execute trade directly between users of the system and external markets. Holders of such large, diversified portfolios have usually been long-term investors. The system allows active market participation by such investors whereby they provide added liquidity and depth to the securities markets while overcoming problems caused by trader identification and the inability to enter, change or execute orders in a real time environment. The system monitors and analyzes a variety of factors which effect trading decisions in a vast number of securities. Such factors include other security trades, price and size quotations and financial ratios for particular securities. This information is further analyzed in relationship to each investor portfolio using the system to determine what transactions might benefit the portfolio by seeking to provide an incremental return while accommodating the basic portfolio objectives. These objectives may be changed at the election of the investor at any time. Orders representing such transactions are entered by the system and executed in real time either internally between system users or externally with computerized brokers and/or stock exchanges and markets.

Braddock, et al. U.S. Pat. No. 4,412,287, for an AUTOMATED STOCK EXCHANGE, issued Oct. 25, 1993, discloses an automated stock exchange in which a computer matches buy and sell orders for a plurality of stocks. An open board simultaneous trading environment is simulated through two stages. The first stage is an order accumulation period which is continuously in operation except for one stock in the second stage. The second stage is an extremely rapid sequential call through. All orders for a given stock are available to customers during the first stage. During the second stage market orders are matched with market orders, then market orders are traded against limit orders as the trading price changes within controlled ranges. The system will also process stop orders, and other specialized transactions.

See also U.S. Pat. No. 5,950,176.

There is a rich literature on various theoretical models of market-making and the behavior of market-makers. The contributions of these models are limited to theoretical understandings of the economics of the market-making process under simplified assumptions.

Hakansson, et al., "On the Feasibility of Automated Market Making by a Programmed Specialist," *Journal of Finance*, 40(1):1-20 (1985) describes an automated specialist that balances excess demand due to discontinuous aggregate demand functions. Kalman, et al., "A Simulation Model of Stock Exchange Trading," *Simulation*, 4:181-191 (1991) proposes a model of an automated specialist that stabilizes prices.

At their best, the prior systems provide passive order handling. What is needed is a system that handles services currently handled by humans, such as price discovery, supply of liquidity, and price stabilization.

OBJECTS AND SUMMARY OF THE PRESENT INVENTION

It is an objective of this invention to provide, by means of a software agent, all the essential market-making functions of a human market-maker.

It is an object of this invention to provide an adaptive agent that learns from past experience and places lesser dependence upon fixed rules.

It is an object of this invention to provide a complete set of market-maker functions, rather than specializing in a portion of a market-maker's functionality.

The above and other objects of the present invention are realized in a programmed controlled trading platform and system for making markets for financial and non-financial securities. The inventive system operates as a market-maker for one or more pre-select securities by establishing price points for buying and selling, and further, for managing trading flow to minimize trading disruptions. The system implements a program defined interactive trading manager responsive to market conditions, historical trends and risk models to establish market bid-offer pricing, execute trades, and enhance trading flow. This is accomplished by use of a multi-module trading platform, wherein individual modules are programmed to influence trading in a select manner. In one embodiment, the system utilizes trading modules to influence (i) market quality, (ii) inventory control, and (iii) risk speculation. The output of these modules are processed by the inventive platform, and responsive market events are triggered to coordinate market conditions.

In accordance with the varying aspects of the present invention, the system tracks and stores trading activity and price behaviors, creating a database of historical trading trends. These trends include discernible patterns that reflect repeating trading behavior and, as such, become a "learned" knowledge base for the system. This database is then applied to modulate future trading by the system modules.

The foregoing features of the present invention may be better understood by review of the following description of an illustrative example thereof, taken in conjunction with the drawings of which:

DETAILED DESCRIPTION OF THE INVENTION

First briefly in overview, the present invention is directed to a computerized trading system for use in trading securities and other financial instruments. The trading system is established as an integrated network with plural workstations linked and in communication with one or more servers and mainframes to manage the order volume and processing demand.

Command logic resides on one or more processors operated by the system proprietor <Market-Maker>, in communication with traders. Flow of information is bi-directional. The system proprietor delivers current price data in the form of bids/offers of securities selected for trading. This information is uniformly delivered to all participating traders by the computer system. In addition, "last execute" trade data is distributed to traders by the system proprietor, reflecting current market conditions.

In response, traders enter purchase and sell commands at select volumes. This data is transferred to mainframe and processed in accordance with a select trading algorithm. Specifically, three distinct modules are pre-programmed to assess a number of discrete variables and selectively control bid/offer pricing, trade execution, and trade volume.

As orders are entered, system logic executes trades and adjusts market pricing in accordance with input from the three distinct modules. Enhanced trading is established by the influence of these modules, often implemented by the market-maker acting as a principal to effect trades and thus market depth and direction.

The inventive system operates in concert with an automated trading processor. Exemplary automated trading systems are found in U.S. Pat. No. 4,903,201 to Wagner, U.S. Pat. No. 4,674,044 to Kalmus, et al., and U.S. Pat. No. 5,905,974 to Fraser, the contents of each are incorporated herein by reference.

The inventive system can be optimized to meet the specific needs of any kind of market that it is applied to. The system may be integrated into already existing electronic exchanges, such as Frankfurt, Globex, and OptiMark exchanges and may also be used to create entirely new and fully automated financial and non-financial exchanges (e.g., network bandwidth, antiques, electricity) so as to enable global automated 24 hour trading in virtually any product. As optimized and regulated by exchange rules, the system provides (a) price discovery, (b) liquidity and immediacy, and (c) price stabilization to the market to which it is applied. Price discovery is the process of determining the price of a security, given the demand and supply of the security. By setting the quotes in the market, the market-maker effectively determines the price. In setting price, the market-maker assesses past trading patterns and further, reads the limit order book (unavailable to traders), and applies this data to adjust its price response.

In supplying some of these services, in particular liquidity and price stabilization, the system enters commands to implement trades as a trading principal. In this aspect, the system commands trigger equity positions involving exposure, and often resulting in unwanted inventory. By properly applying this information, however, the system maintains a tight bid-ask spread and a reasonable depth (which implies a small price impact for trading with market orders).

Price stabilization is one of the affirmative functions of the system, focusing on maintaining a fair and orderly market. This is accomplished by maintaining transaction prices and reducing trading induced price deviations and fluctuations. For example, when sell orders increase, and the stock price drops significantly, the system triggers more buy commands so as to prevent the price from falling too much and too rapidly, even though this increases the level of inventory.

Figure 1:
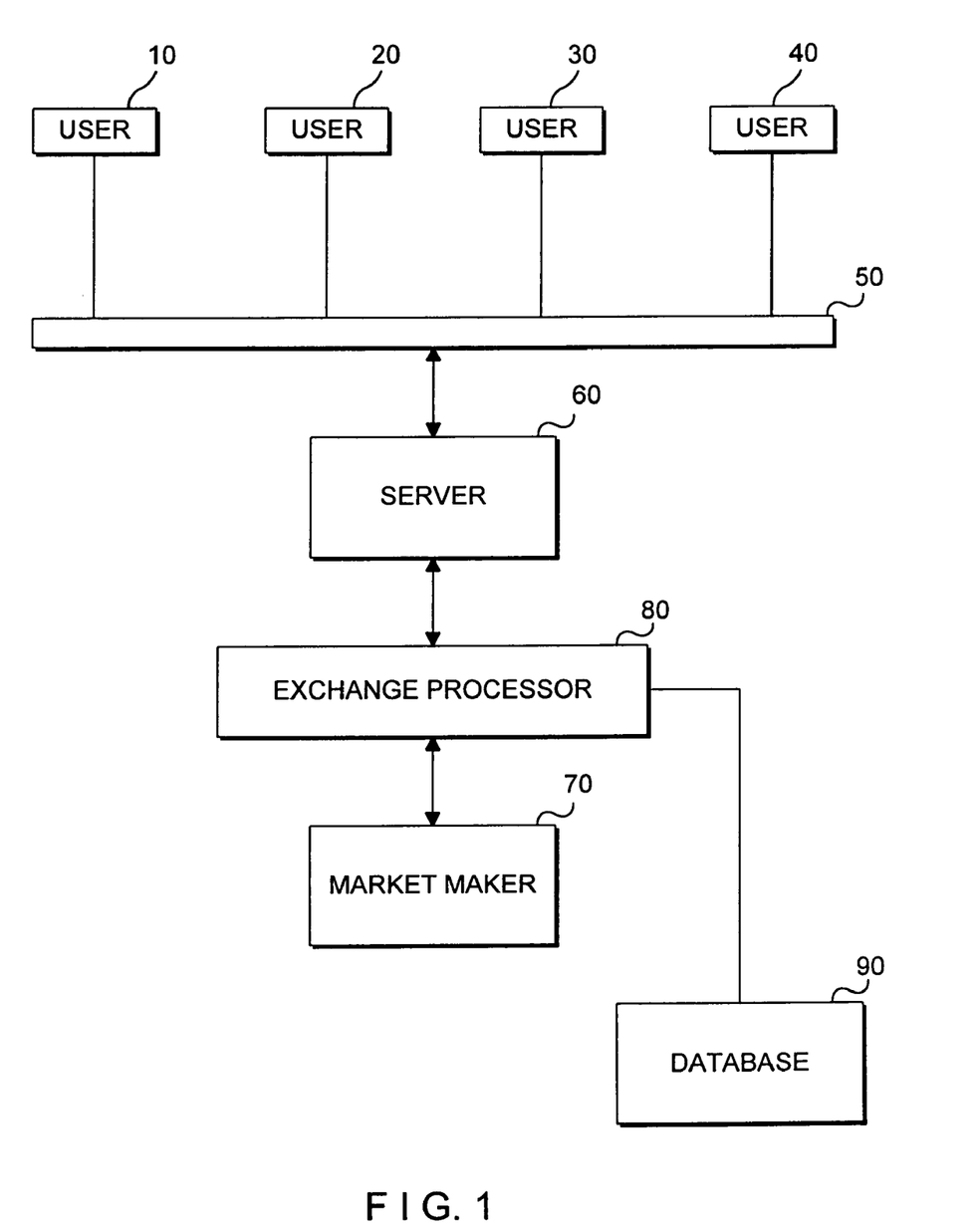
FIG. 1 depicts a network environment for the present invention.

With the above overview in mind, the system operation may be accomplished on a platform as detailed in FIG. 1. In this Figure, the traders are identified as USERS and four select USERS (blocks 10-40) are connected to communication interface 50. This interface can be one of many potential links between traders and the trading system. For small exchanges, this may be a simple multi-node network, utilizing an intranet to effect communication and data transfer. For larger trader populations and expanded territories, the communication interface 50 may be the Internet. Such extensive public access networks of that type will likely require fire walls (not shown) and other security mechanisms to insure proper trading.

Continuing with FIG. 1, the system proprietor operates a communication server 60 to govern interaction with exchange processor 80. The exchange processor interprets current market trends, recalls past trading activity from affiliated database 90, and selectively recommends price/trade positions to the market-maker 70. In accordance with the specific procedures outlined below, the market-maker sets price and participates in the market in a manner to allow for smooth and fair trading.

Figure 2:
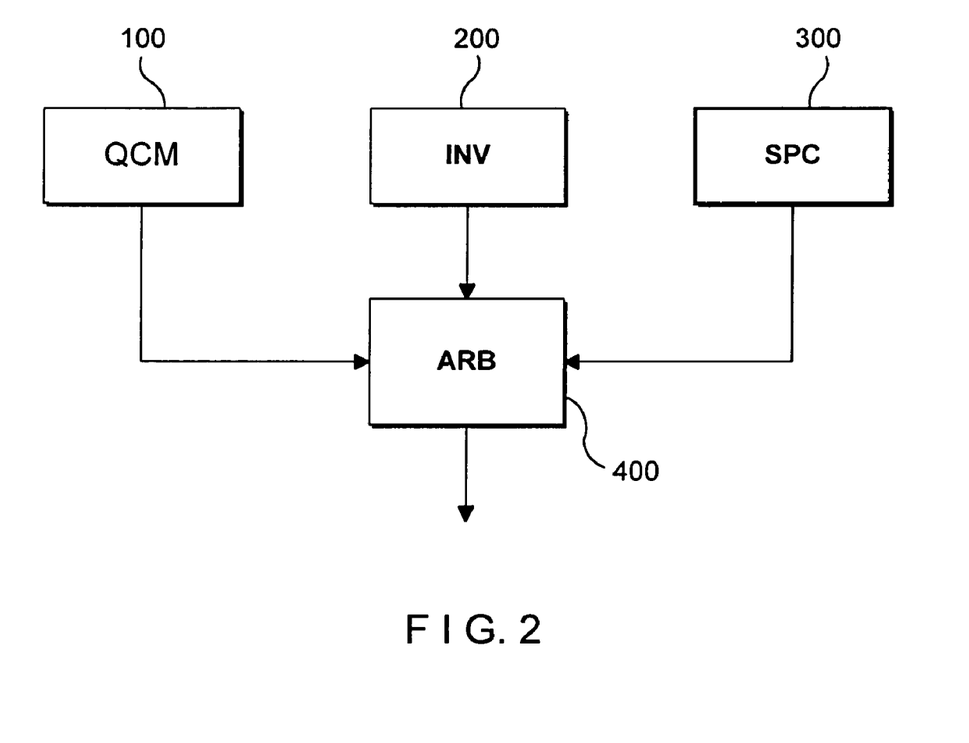
FIG. 2 provides a functional block diagram reflecting the separate modules of the present invention.

Turning now to FIG. 2, the invention comprises three basic modules, a Market Quality Control Module 100, an Inventory Control Module 200, and a Speculation Module 300. The outputs from these modules are in the form of buy and sell recommendations. An Arbitration Module 400 is provided to receive the outputs of the basic modules, which may give conflicting recommendations, and weigh them so as to deliver a single buy or sell command. The operation of these individual modules is discussed below.

The present invention is implemented on a program controlled data processor as described herein. The operation of the processor is reflected in the series of flow charts that depict the governing logic. In these charts, select variables are employed to track values and perform the requisite calculations. Table I below delineates the variables used in the context of the specific implementation presented here, with the understanding that this example is only one of plural approaches that vary depending on the scale, operating system, and underlying coding.

TABLE I

| | |
|---|---|
| TRD_ORD(ID, T) | Trade Order at time T |
| Bbid(T) | Best bid at time T |
| Bask(T) | Best ask at time T |
| Bid/Ask(T) | Spread at time T |
| Cust(ID) | Trader/Broker |
| INV(T) | Inventory of shares at time T |
| INV_CHG(T) | Inventory change recommendation |
| B | Bid |
| P | Price |
| V | Volume |
| Mark(T) | Market parameters at time T |
| EMM(ID) | Electronic Market-Maker |
| QCM | Quality Control Module |
| SPC | Speculation Module |
| INV | Inventory Module |
| ARB | Arbitration Module |
| T | periodic counter |
| ID | unique identifier - security |

The following flow charts are presented as sequential processing, presenting the operation at a high level of programming. This is merely a vehicle to demonstrate the underlying logic structure and to delineate that types of processing steps and data transformations inherent to the operation of the present invention. In actual implementation, the system will employ a number of different programming regimens including sequential, parallel, hierarchical, boolean, and the like. While sequential processing is depicted, this is for explanatory purposes; best results are achievable with parallel or similar processing regimens. In either event, coding may include continuous, real time or batch operations, object oriented, local or remote compiling, multi-string and/or other processing techniques, coding platforms and languages as necessitated by the scale and distribution of the data processing requirements.

Market Quality Control Module (QCM)

Most exchanges have specific rules to maintain a minimum level of quality in the marketplace. One of the objectives of this invention is to facilitate a market response system that provides the highest and fairest trading markets possible. This is in fact a specific objective of the Market Quality Control Module. This Module will preferably influence Price Stabilization, Bid-Ask Spread, Market Depth, and other quality issues.

Price Stabilization is actualized through a set of rules. Depending on the average price and volatility of a particular security, a maximum permissible price fluctuation is enforced. If execution of a trade order would result in a price change that is larger than the maximum allowable fluctuation, the QCM would recommend that the trade be executed within the allowable range. Assuming the Arbitration Module permits, the EMM would trade against its own account and absorb the loss in the interests of market quality.

Bid-Ask Spread is the cost to trade with a market order. The EMM maintains an upper bound for the allowable bid-ask spread, depending upon the average price and volatility of the security. If an outstanding best bid and best offer differ more than the maximum, the QCM will issue a recommendation to insert the EMM's quotes on either side of the trade to reduce the spread.

Market Depth refers to the ability of a market to avoid major fluctuation when a large block of shares is traded and may be actualized by the QCM by recommending to trade very large blocks of shares in increments of smaller blocks at maximum permissible price increments or decrements.

Generally, the QCM will contribute to the maintenance of price continuity with reasonable depth. It is preferred that the QCM follow other quality rules such as only buying on a plus tick or buy substantially all stocks in the "book" on a zero plus tick. In general, the QCM should refrain from any destabilizing trades and place the priority of its own trading beneath that of the public.

Figure 3:
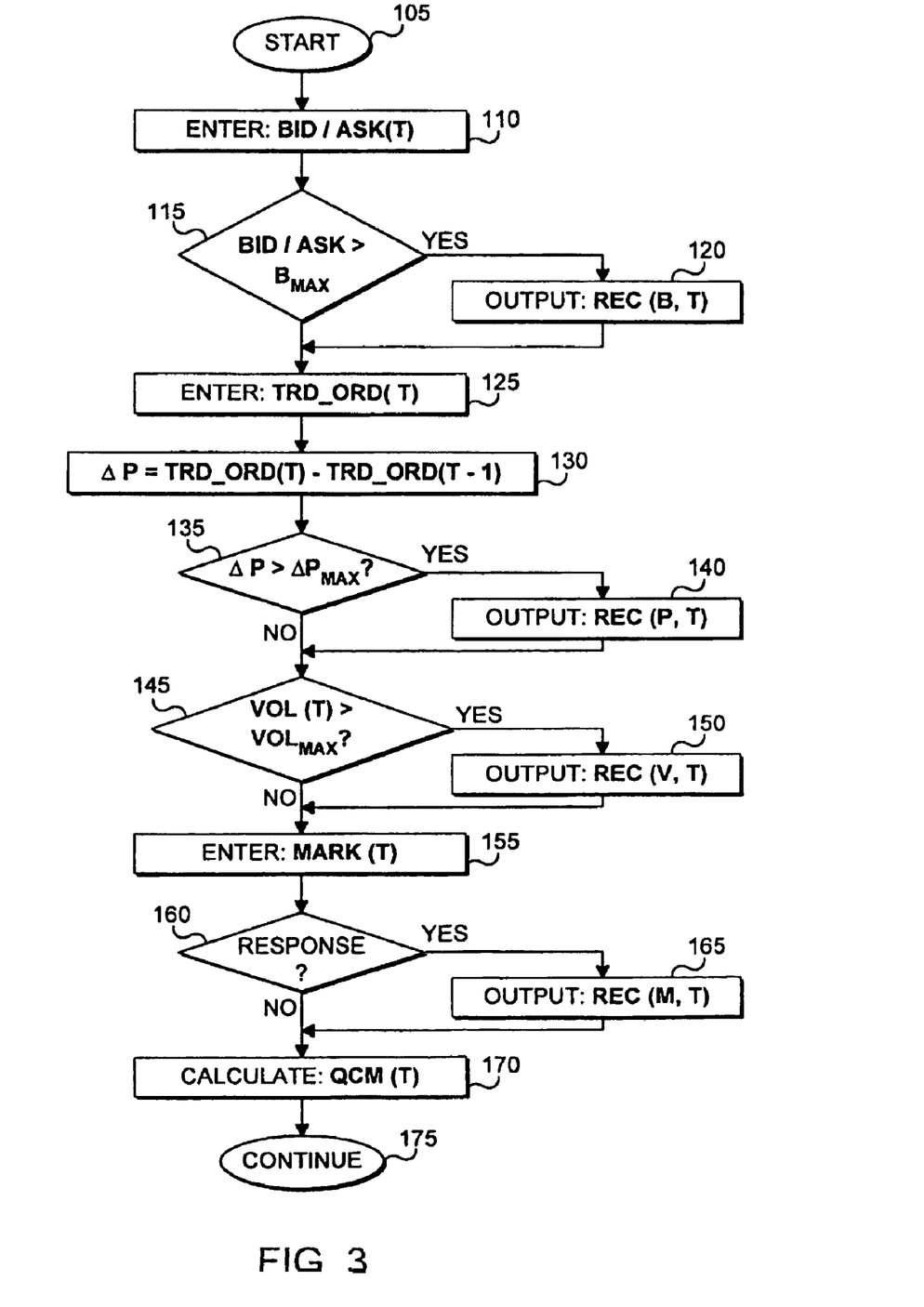
FIG. 3 is a logic depicting flow chart for describing the controlling logic of the Quality Control Module.

Turning first to FIG. 3, the logic of the Quality Control Module or QCM is depicted, beginning conceptually with start block 105 and the entry of the current bid/ask spread, Bid/Ask(T) at 110. Test 115 compares the current spread with a stored maximum, Bmax, to see if the magnitude is excessive. In this example, the Bmax value is presented as a constant, for illustration. In actual practice, the acceptable spread will often be a variable, contingent on market conditions at the time the value is rendered. For example, at times of light trading and slow price movements, the acceptable limit of spread, Bmax may be significantly lower than that at times of more turbulence.

If the Test to 115 is positive, logic branches to 120 and the system outputs a recommendation, REC(B,T) suitable for addressing the out of limit condition. Similarly, at 125, the system enters the current security order, TRD_ORD(T) and applies it to determine the direction and magnitude of the price changes in the market, delta P, at 130. Test 135 detects excessive price changes in orders, with a correcting recommendation triggered at 140, REC(P,T).

Continuing with FIG. 3, Test 145 detects order volumes that are larger than a prescribed maximum level, with the corrective action outputted at 150 as REC(V,T). This recommendation may involve a variety of actions by the market maker, including the division of pending large orders into smaller increments. Finally, at 155, the system enters select market parameters, such as buy commands on the zero plus tick. If the condition triggering the response is detected at Test 160, the system outputs the appropriate, system defined response at 165, REC(M,T).

The above responses, formed at select action recommendations are aggregated into a quality control command, QCM (T) at 170 for submission to the Arbitration Module, as is discussed below.

Inventory Control Module (ICM)

The Inventory Control Module is concerned with keeping an optimal level of inventory by the EMM. This inventory is obviously needed to enable the EMM to execute various quality-control trades as described above for the QCM.

In the process of stabilizing the price, the EMM may have purchased or sold shares of the security that result in an undesirable position. If this position is too high, it will be necessary to reduce it by lowering the offer price and raising the bid price so as to encourage buying and discourage selling from the public.

In the market micro structure literature, inventory models are one of the major contributions regarding the market making process. The inventory model addresses the issues of how a market-maker deals with price and inventory uncertainty. Garman, "Market Micro Structure," *Journal of Financial Economics* (1976); Amihud and Mendelson, "Dealership Market: Market-Making With Inventory," *Journal of Financial Economics* (1980); Ho & Stoll, "Optimal Dealer Pricing Under Transactions and Return Uncertainty," *Journal of Financial Economics* (1981); Ho & Stoll, "The Dynamics of Dealer Markets Under Competition," *Journal of Finance* (1983); and O'Hara and Oldfield, "The Microeconomics of Market Making," *Journal of Financial and Quantitative Analysis* (1986), the disclosures of which are incorporated herein by reference in their entirety, provide models of how market-makers as price-setting agents maintain inventory at an optimum level according to their objectives, such as profit maximizing or survival. The general approach of these models is to assume a price process, the characteristics of the order flow, and the risk aversion of the market-maker, and then approach the task as a dynamic control problem. The solution to the problem gives the bid and offer prices that satisfy some optimum inventory conditions.

In reality, the complexity of the problem makes conventional optimization methods impractical. The design of the EMM, therefore, most preferably applies to heuristic rules and various learning algorithms such as reinforcement learning. In a preferred embodiment, the EMM targets at zero inventory all the time. Maintaining zero inventory is not uncommon among human specialists, especially when they are facing a high degree of uncertainty. Nevertheless, the ultimate goal of the Inventory Control Module is to be able to adjust the target level based on market information. For explanatory purposes, inventory is presented as merely the quantity of a security held by the market maker. In actuality, the important character of inventory is the relative position by the market maker in terms of exposure, such as "long" or "short" in the security. This may be accomplished either by direct purchases or through positions in the futures or options markets.

The EMM targets at inventory levels that depend on the market conditions, and always provide quotes so as to attain these levels. The EMM can accomplish this via learning in different market scenarios. For example if the target level is long 1000 shares and current holding is 1500 shares, the IC module will recommend lower (bid and ask) prices so as to encourage the public to buy from the EMM's holding. On the other hand, if the holding is short 500 shares, the IC module will recommend high prices so as to encourage the public to sell to the EMM.

Figure 4:
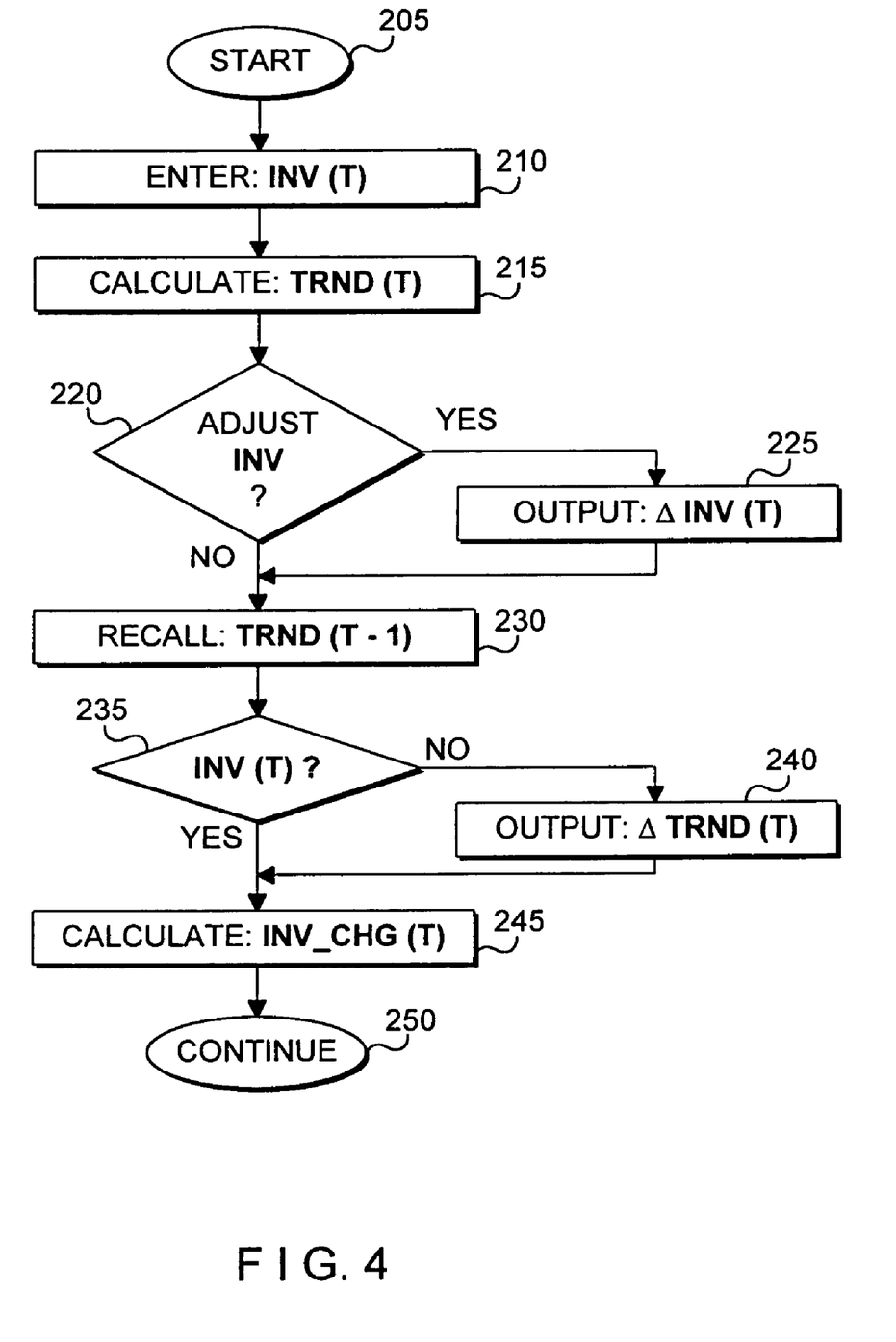
FIG. 4 is a logic depicting flow chart for describing the controlling logic of the Inventory Module.

The Inventory Control Module operates in a similar manner as depicted in FIG. 4, with logic conceptually beginning at start block 205 and continuing at first to 210 and 215 for entry of the current inventory level, INV(T) and calculation of the current inventory trend, TRND(T). These values are then assessed at Test 220 to determine if the inventory level needs adjustment. For example, the system may simply test for any positive (long) inventory of the salient issues with the test triggering a response with the objective to drive inventory levels to zero. The responsive command is outputted at 225 in the form of an inventory change variable, $\Delta INV(T)$.

Continuing with FIG. 4, the system applies a learning algorithm so that future adjustments are modulated with system experience. This is exemplified by recall of the past trend, TRND(T−1) from the database and its ultimate influence on the current inventory level, as detected at Test 235. A failed test branches logic to 240 wherein the underlying variables that control application of the trend to balance inventory are adjusted, $\Delta TRND(T)$. At 245, the resulting inventory change recommendation is calculated, INV_CHG(T).

Speculation Module

The inventory approach to the study of market-making focuses on the effects of inventory carry risks on market prices. Information-based models, on the other hand, emphasizes the role of private information in the market. These models attempt to explain price behavior and dynamics in the market by depicting a market with informed and uninformed traders. Informed traders are those who possess private information about the security and trade out of profit-making motives. Uninformed traders trade because of liquidity needs. In dealing with these two types of traders, the market-makers are facing the adverse selection problem: the informed buy when price is too low and sell when price is too high. Consequently, the market-makers always lose when trading with the informed. Nevertheless, the informed traders reveal what they know whenever they trade. Therefore, it is possible that the market-maker can infer the price from the informed. The essence of the information-based model lies in the learning of the underlying true price from the order flow. Most of the models in the literature solve a Bayesian learning problem. Glosten and Milgrom (1985) and Madhavan and Smidt (1991) study the pricing strategies of market-makers who are Bayesians.

In light of the information-based models, the speculative module of the EMM focuses a market-maker's learning or speculation of the true price based on all available information: information from the order flow, order imbalance in the limit order book, market conditions, etc. The assumption that a market consists of informed and uninformed groups is obviously an oversimplification, but nevertheless useful for the purposes of an automated EMM. In a real market, the true price of a security is generally unknown or unavailable. The target of learning, in this case, is more like an approximation of a market clearing price at a particular moment given current market information. In addition, the use of learning techniques to uncover any trends, patterns or underlying mechanism is also crucial to the success of the Speculation Module. Speculation is much less well-defined due to the lack of theories, yet speculation is so crucial in the real-world market that it cannot be ignored. The forecast of future price movement is the primary function of the SM. Given the market information, heuristic rules in the SM can predict the future price movements. For example, if there are more buy orders than sell orders in the limit order book, the SM will predict that the price is more likely to go up than go down. The SM also employs learning algorithms to uncover any trends, patterns or underlying mechanism in the price process. However, the forecast is also useful for determining a target inventory level for the Inventory Module. For example, if the price is expected to go up, everything being equal, the SM would recommend to carry a higher long position.

Figure 5:
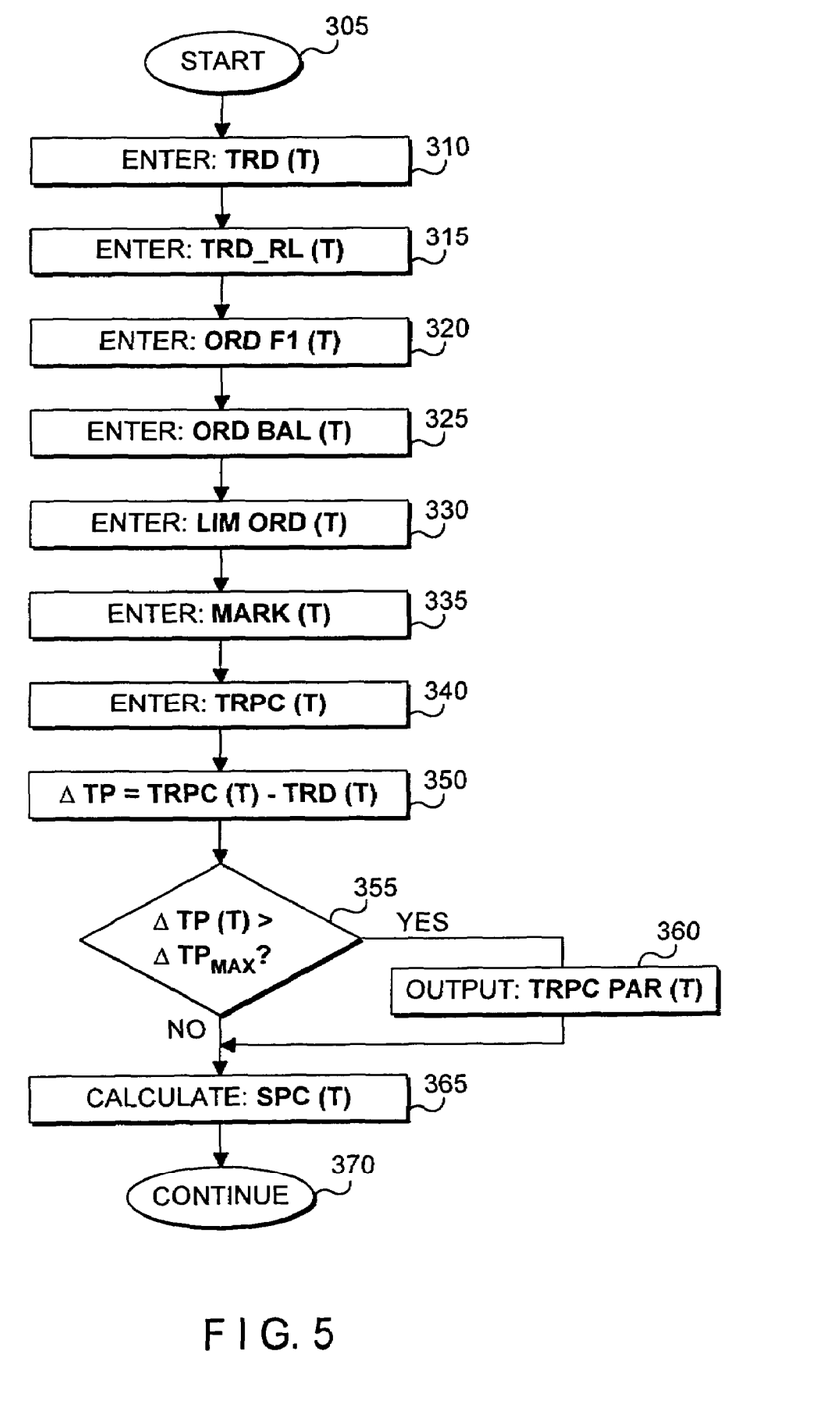
FIG. 5 is a logic depicting flow chart for describing the controlling logic of the Speculation Module.

The Speculation Module is controlled by the logic structure found in FIG. 5, beginning with start 305 and the selective entry of current market variables critical for implementing the system defined speculative function. These variables are exemplified in this routine by:

I Trade data, TRD(T); at 310
 II Trades of related issues, TRD_RL(T); at 315
 III Order flow, ORDFL(T); at 320
 IV Order balance, ORDBAL(T); at 325
 V Limit orders, LIMORD(T); at 330
 VI Market parameters, Mark(T); at 335

Once collected, the system determines the true price of the security of interest, 340 and then contrasts this calculated value of price against the then present market price, 350. If a significant price discrepancy is detected at Test 355, logic branches to 360 and the system outputs command TRPC_Par (T) that corresponds to the assessed discrepancy. This value is then applied at 365 to produce the speculation command—market order, SPC(T).

Arbitration Module (AM)

Generally, the overall output of the system (i.e., the output of the Arbitration Module) will preferably be a weighted average of the outputs of the three basic modules based upon the relative importance of their functions, though other formulations are acceptable. By controlling the weights, one can tune the invention to satisfy the specific needs of the market. For example, one can set the EMM to maximize profits at the expense of market quality, or conversely to hold profits at zero while maintaining the highest quality possible. Profits are a function of the Inventory Control and Speculation Modules. These weights may be set in advance, but it is preferred that the EMM be "trained" with simulated or experimental data.

Figure 6:
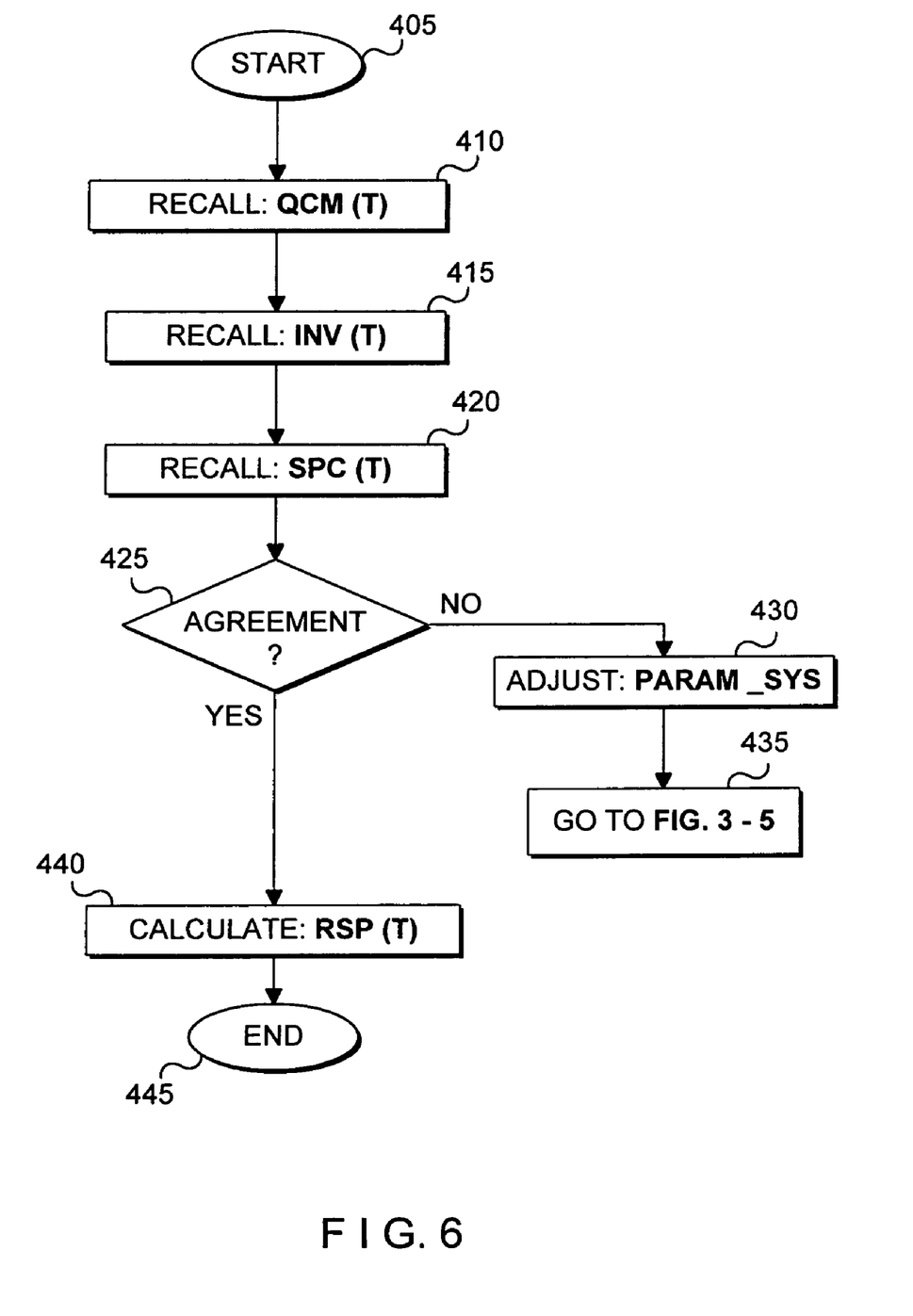
FIG. 6 is a logic depicting flow chart for describing the controlling logic of the Arbitration Module.

The above module outputs are combined in the Arbitration Module as delineated in FIG. 6. Logic begins at Start 405, with the system recall of each of the expert recommendations of the individual modules that are in operation. In this example, three modules are processing market conditions and reporting recommendations to the market maker. At 410, the system receives the recommendation from the Quality Control Module, for the T cycle. Recommendations are likewise received from the remaining two other modules in this implementation, Inventory Control, 415 and Speculation, 420. Each of these recommendations are the select outcomes of their respective individual module processing and influence.

Importantly, different market conditions will result in conflicting recommendations from the modules. For example, the Speculation Module may recommend increasing inventory of a select equity, while the Inventory Module recommends the opposite. The system tests to see if there is agreement between the Modules at 425. This test may take a variety of forms with the objective of rationalizing the overall response of the market maker to the disparate recommendations of the individual module. A simple test would merely confirm that all modules are pointing in the same direction; that is all are recommending a change in position by the market maker either long or short. With only three modules, this is a possible algorithm for Test 425. When the system implements more modules, universal agreement in direction is a less likely occurrence and the algorithm takes a pronounced greater complexity. Whatever the form, the overall objective of the algorithm is to detect a fundamental failure to reach consensus among the modules so that the market makes does not undertake a poorly supported corrective action.

When consensus fails; a "no" to Test 425—logic branches to block 430, and the system adjusts the underlying parameters for use in the individual modules. This often involves increasing limits and/or ranges for assessing market variables. After this is accomplished, the system recycles, 435 and the recommendations from the modules are collected with the new parameters in place.

Once consensus is reached, the system calculates the response for the market maker, 440, expressed as RSP(T).

$$RSP(T)=f(QCM(T))+f(INV(T))+f(SPC(T)) \quad (1)$$

The response is determined in accordance with the foregoing relationship and this is then implemented by the market maker.

As stated earlier, an important long-term function of the present invention is to assess performance of the market maker based on the stored protocols used to implement trading strategies and to adjust the parameters governing the market maker so that future performance exceeds past results. This includes learning algorithms and a rudimentary form of AI—artificial intelligence. In implementation, the system creates a performance gauge or measure for the market maker—such as average liquidity or profitability from capital. At select intervals, known as a learning cycle, the system aggregates the performance data and calculates the current performance quotient. This is compared to historical data and the governing algorithm is adjusted in response to the current performance. Exemplary changes include increasing the coefficients used in the Quality Control Module—and thus increasing its overall influence on the market position of the market maker. Initial results may retard profitability as the market maker strides for enhanced liquidity and market depth; over time however, this minor change may increase profitability as more traders enter in view of the more predictable and stable prices. Whatever the reaction, the system records the trend and stores this for use in conjunction with future parameter adjustments.

Figure 7:
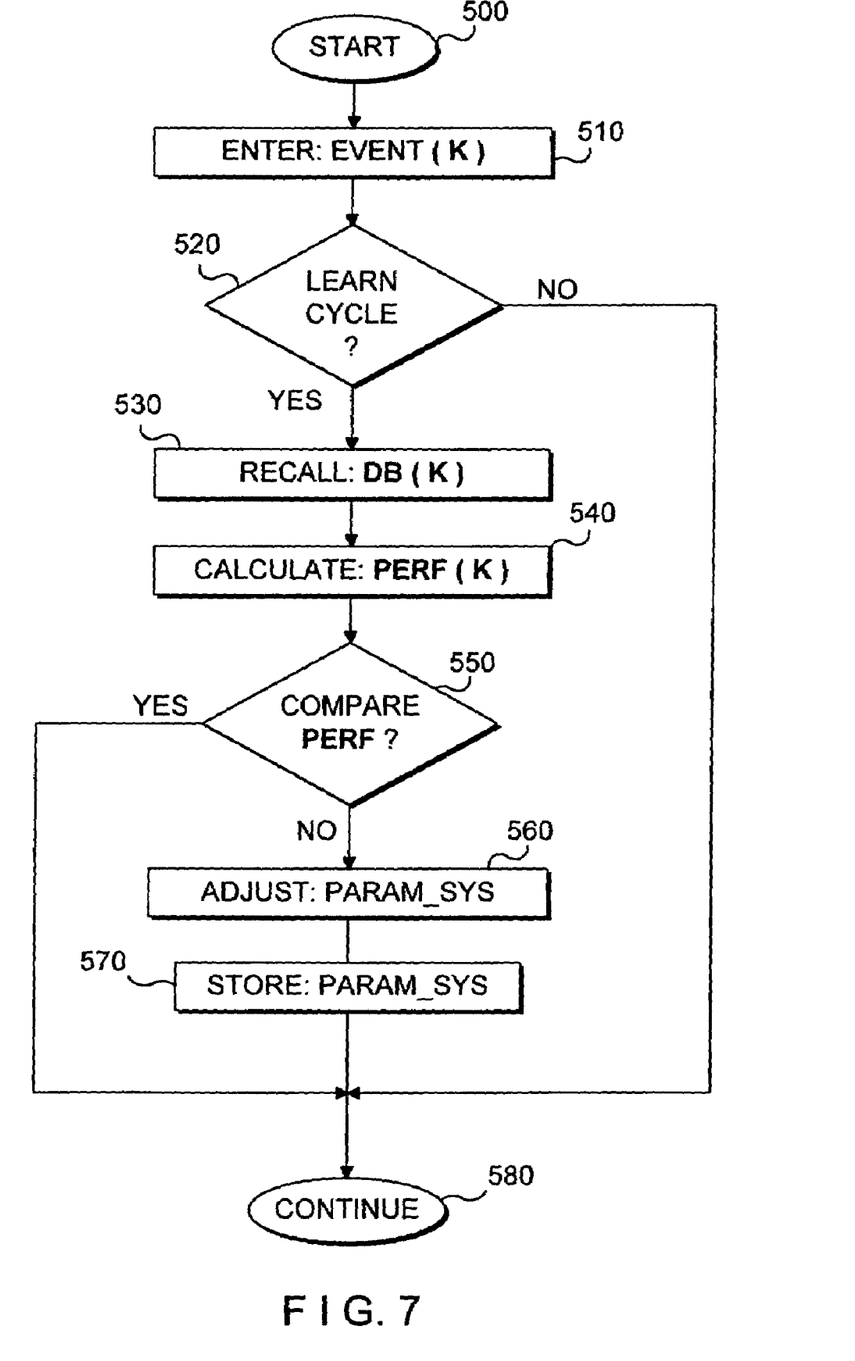
FIG. 7 is a logic depicting flow chart for describing the operative learning cycle of the present invention.

The above processing is depicted in FIG. 7 with processing starting at block 500 and entry of the event cycle, block 510. Test 520 determines whether the event is a scheduled or triggered learning cycle; if so, logic continues to block 530 and the recall of the database comprising the key data used to assess current performance of the identified performance criteria. At block 540, the system applies the recalled data—historical values—as combined with the current data and calculates the performance criterion—Perf(K) for the K cycle. Test 550 compares this value with the past measurements; if the performance meets some minimal requirement, logic branches and no adjustments are made. However, if the performance is below this measure, the system will perform a parameter change cycle, with the system parameters adjusted at block 560. These new parameters are stored at block 570 and thus available during the next cycle.

Although the invention has been described in detail for the purpose of illustration, it is to be understood that such detail is solely for that purpose and that variations can be made therein by those skilled in the art without departing from the spirit and scope of the invention.

What is claimed is:

1. A data processing system for use in establishing operating parameters for use in supporting the operations of a securities market by implementing an Electronic Market-Maker, said system comprising a data processor and:
    a Market Quality Control Module for receiving inputs including trade orders and select market conditions, and based thereon, generating trading recommendations with a primary objective of maintaining market quality;
    an Inventory Control Module for assessing market conditions and a position of said market maker in one or more select securities, and based thereon generating trading recommendations to adjust inventory levels to enhance market maker position;
    a Speculation Module for assessing market conditions during past and current time periods, and generating trading recommendations; and
    an Arbitration Module for receiving trading recommendations from said Market Quality Control Module, Inventory Control Module, and Speculation Control Module,
    wherein said Arbitration Module resolves any conflicts between said received recommendations and delivers a buy or sell command,
    wherein said data processing system receives said command and executes one or more trades, and
    wherein said Market Quality Control Module, Inventory Control Module Speculation Module, Arbitration Module comprise software implemented by said data processor and stored on a computer-readable medium accessible by said data processor.

2. The system of claim 1 wherein the Market Quality Control Module comprises input for receiving information regarding current market price, volume and spread for a select security.

3. The system of claim 2 further comprising a database for storing system controlling parameters, and a learning cycle processor for incremental adjustment of said parameters based on historical data and performance.

4. The system of claim 1 wherein the Market Quality Control Module develops an output for minimizing large price excursions.

5. The system of claim 4 wherein the Market Quality Control Module develops an output in the form of a trade recommendation to minimize a bid/ask spread.

6. The system of claim 5 wherein the Market Quality Control Module develops an output that includes a recommendation to subdivide one or more large trades into smaller blocks.

7. The system of claim 1 further comprising a set of learning algorithms that determine the parameters within the Market Quality Control, Inventory Control, and Speculation Control Modules.

* * * * *